United States Patent [19]
VanDerStuyf et al.

[11] Patent Number: 5,297,976
[45] Date of Patent: Mar. 29, 1994

[54] SEALABLE ELECTRICAL CONNECTOR FOR AN AIRBAG SENSOR

[75] Inventors: Allen VanDerStuyf, Novi; Shane Vartti, Berkeley; Dewey Mobley, Lake Orion, all of Mich.

[73] Assignee: Electro-Wire Products, Inc., Dearborn, Mich.

[21] Appl. No.: 62,818

[22] Filed: May 17, 1993

[51] Int. Cl.⁵ .............................................. H01R 13/00
[52] U.S. Cl. ............................................... 439/271
[58] Field of Search .............................. 439/271–283

[56] References Cited

U.S. PATENT DOCUMENTS

| | | | |
|---|---|---|---|
| 3,517,373 | 6/1970 | Jamon | 339/94 |
| 3,603,912 | 9/1971 | Kelly et al. | 339/89 |
| 3,704,870 | 3/1955 | Minto | 339/94 |
| 4,441,777 | 4/1984 | Harootion | 339/94 |
| 4,717,355 | 1/1988 | Mattis | 439/452 |
| 4,857,007 | 8/1989 | Michaels et al. | 439/283 |
| 5,100,335 | 3/1992 | Yamamoto | 439/271 |
| 5,116,236 | 5/1992 | Colleran et al. | 439/271 |
| 5,187,328 | 2/1993 | Burgess et al. | 174/52.2 |

*Primary Examiner*—Joseph H. McGlynn
*Attorney, Agent, or Firm*—Krass & Young

[57] ABSTRACT

A sealable electrical connector includes a housing having a passage therethrough which is open at both ends. A portion of the length of the passage defines a seal retaining region and includes an undercut edge. The seal retaining region receives an elastomeric seal ring which engages, and is retained by the undercut edge. A grip member which includes projecting electrical contacts is affixed to one end of the housing so as to seal the passage, to further retain the seal ring therein and to support the electrical terminal into the passageway. When a mating connector is inserted into the passageway for contact with the terminal therein, the sealing ring provides a sliding, seal with the mating connector against environmental conditions. Also disclosed is an improved ring seal providing uniform resistance to the insertion of a mating connector. Also disclosed is a sensor assembly including first and second bracket members which coact to mount the sensor in a sensor housing in a first interrelationship in which the sensor axis is generally perpendicular to the mounting plane of the housing or, alternatively, in a second interrelationship in which the sensor axis is generally parallel to the mounting plane.

24 Claims, 5 Drawing Sheets

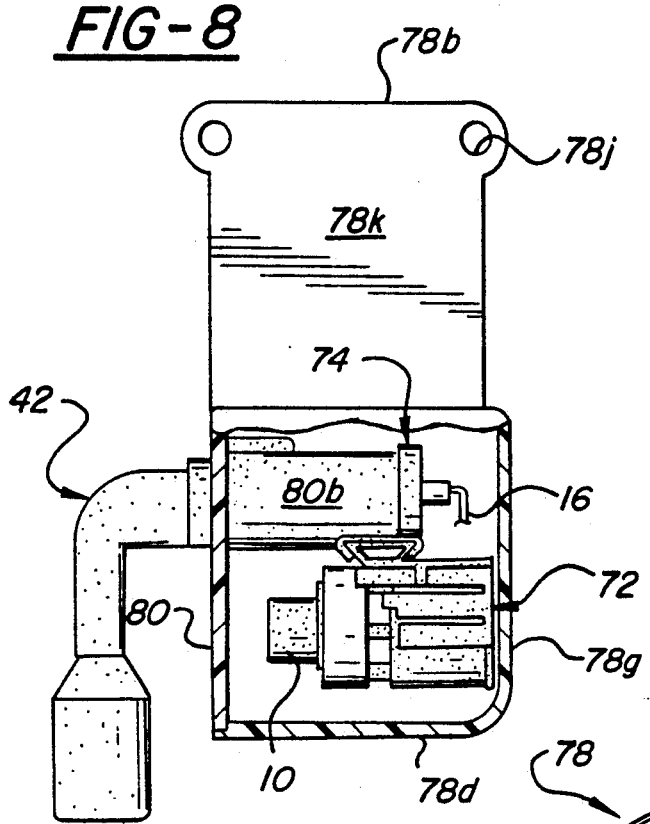
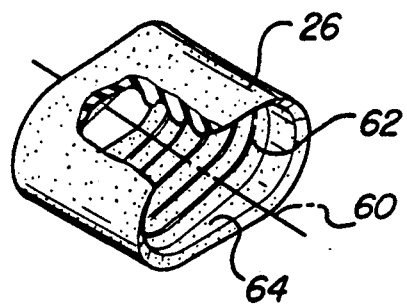
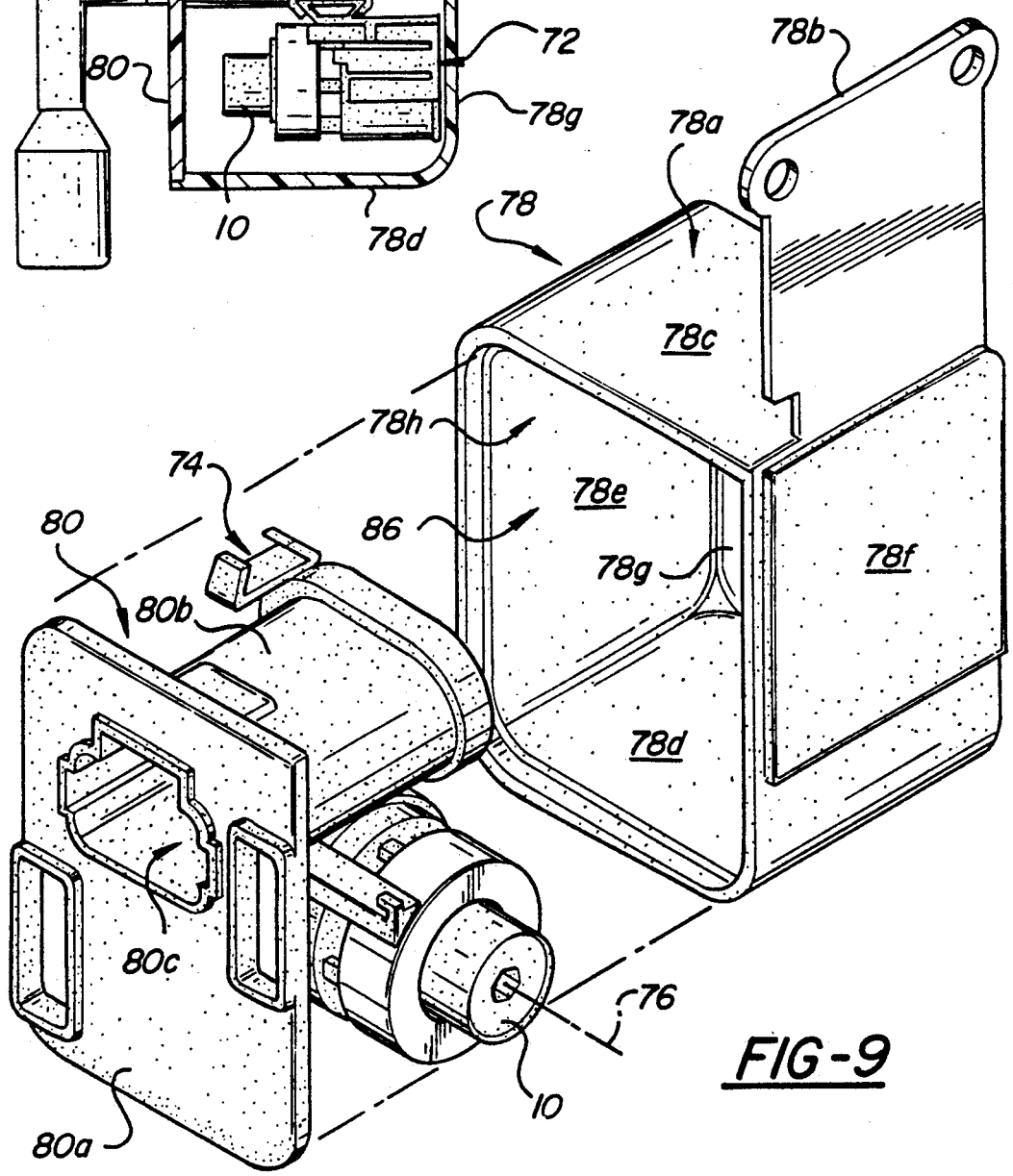

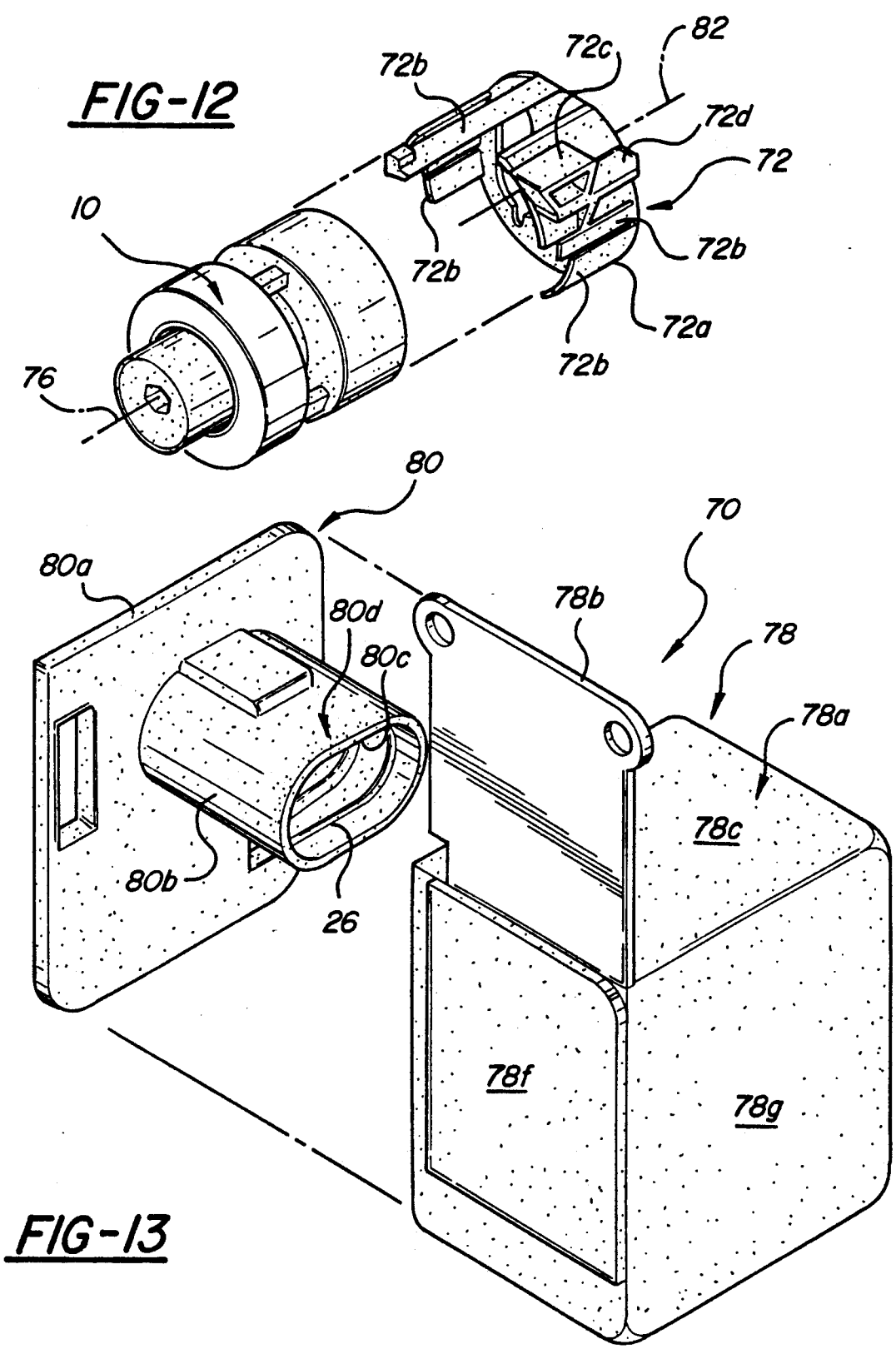

SEALABLE ELECTRICAL CONNECTOR FOR AN AIRBAG SENSOR

FIELD OF THE INVENTION

This invention relates generally to electrical connectors. More specifically the invention relates to environmentally sealable electrical connectors; and most specifically, the invention relates to a sealable connector for an airbag sensor, which connector includes a captively retained internal sealing gasket.

BACKGROUND OF THE INVENTION

Safety is an ever growing concern of the consumers and producers of motor vehicles. Many vehicles are now being manufactured with airbags as standard or optional equipment and it is expected that airbags will be standard equipment on all passenger motor vehicles in the near future. Typical vehicular airbags remain in a compacted, deflated state until activated. When the vehicle is subjected to a sudden and large deceleration caused by collision with another vehicle or a stationary object, the bag is quickly activated and inflates by rapid expansion of gases to create a deformable cushion between the driver and the interior of the vehicle, thereby mitigating injury to the driver.

The designer of an airbag safety system is faced with two competing requirements. First, the bag must inflate promptly and, almost instantly, after impact. On the other hand, the airbag must not inflate inappropriately, as may happen if the vehicle is nudged or bumped in traffic or travels over uneven terrain. An inappropriate inflation of the airbag may actually cause the driver to lose control of the vehicle and can lead to a severe accident. In view of these competing requirements, it is critical that the airbag system include an accurate sensor which will reliably generate an activation signal when the deceleration force to which the vehicle is subjected equals or exceeds a preset level, but will not generate the activation signal if the deceleration force falls below that level.

To this end, typical airbag systems employ one or more sensors. The most commonly used sensor comprises a ball and tube accelerometer in which a ball of a certain mass is normally held in a tube by a magnet disposed at one end thereof. When the device is subject to a decelerating force of sufficient magnitude, the ball will become dislodged from the magnet so as to roll to the other end of the tube and cause bridging of a pair of electrical terminals disposed thereat. The closing of the terminals produces a detectable electrical signal which may be used to trigger airbag inflation. Typically, a pair of these sensors are mounted on either side of the front bumper of the vehicle and the third sensor is mounted in the center of the vehicle at a location somewhat further toward the rear thereof. The third sensor acts as an override to prevent accidental activation of the airbag if the bumper sensors are subjected to relatively minor and localized deceleration. The three sensors are in electrical communication with a central processing unit which evaluates the signals therefrom and is programmed to generate an activation signal which triggers the airbag in appropriate circumstances.

The prior art sensors described herein above generally perform successfully in generating an airbag trigger signal under appropriate deceleration conditions; however, systems which employ these sensors can suffer from certain disadvantages when incorporated into a motor vehicle. For example, it is necessary to interconnect the sensors and airbag control unit of the vehicle by electrical wiring. If the sensors are provided in a prewired and preconnected form, handling and installation is very difficult and damage can easily occur. If the sensors are provided as separate units which are installed and later electrically interconnected, problems can also occur because of compromise of the connections. The sensors are typically mounted outside of the passenger compartment of the vehicle and hence are exposed to harsh environmental conditions which can include, dust, dirt, salt, water, oil and grease. Additionally, the sensors are subject to vibration and to impact by stray objects.

Various attempts have been made to seal airbag sensor connections. Ideally, the airbag sensor should be provided as a sealed unit which includes an internal connector and hence is devoid of trailing connectors or wires. This internal connector should establish electrical communication between the sensor and the remainder of the air system via a corresponding external connector in a manner which forms a tight environmental seal. U.S. Pat. No. 5,187,328 describes an environmentally sealed airbag sensor. Connection to this prior art airbag sensor is established via a male connector which has a sealing gasket associated therewith. It has been found that a better environmental seal can be achieved if the sealing gasket is associated with the female or internal portion of the connector; additionally, it has been found that the best environmental seal can be achieved if the sealing gasket employed with the connectors establishes its seal along a substantial portion of the length of the connectors as opposed to forming a mere butt seal.

Attempts to provide a female connector having an internal sealing gasket, particularly a gasket adapted to provide a sliding seal along the length of a mating connector have not been heretofore successful. It has generally been found that retention of the sealing gasket within the connector is very difficult. Proper sealing requires that there be a tight fit between the seal and the mating connector, when the connector is inserted. A tight fitting gasket tends to roll up or pop out. Additionally, it is quite difficult to install a sealing gasket within the female member of the connector pair.

Another problem associated with prior art connectors for airbag sensors arises from the fact that a number of different configurations and orientations of the sensor are employed. For example, accelerometers are often procured from various sources and the external configurations of these different sensors may vary. Additionally, the sensors are usually disposed in different orientations at different parts of the vehicle. Hence, connectors must be specific to different designs of sensor and even to different orientations of members of a group of similar sensors.

Accordingly, it will be appreciated that there is a need for an airbag sensor which includes a sealing gasket captively retained in the interior thereof to provide for a reliable environmental seal. It is also desirable that the connector be easy to assemble and that it be readily adaptable for a variety of sensor configurations and orientations.

The use of captive internal gaskets has previously been shown in the prior art; however, in no instance is there shown an environmentally sealable connector of the type disclosed herein. U.S. Pat. No. 4,717,355 discloses a moisture seal for a coaxial cable. The seal includes a sealing ring which engages a groove in the connector housing. The connector does not provide for sliding contact therepast and the gasket is not retained in a manner which would prevent it from pulling out or rolling up should sliding contact be established. U.S. Pat. No. 4,441,777 discloses a connector having a pair of swaging cones for sealing a wire in a coupling. The cones are not configured to allow for sliding insertion and withdrawal of the wire and are not fully retained in the connector. U.S. Pat. No. 4,857,007 discloses a connector having a sealing gasket retained in a groove. The gasket forms a butt seal and is not configured to provide a sliding seal and is retained in a manner which would not eliminate the problems with gasket pull out or roll up in the event that sliding contact therepast was established. U.S. Pat. Nos. 2,703,870; 3,603,912 and 3,517,373 disclose various electrical connectors having sealing members with trapezoidal cross sections. The sealing members are not retained in undercuts and cannot avoid the problem of gasket pull out or roll up.

The present invention provides for a connector assembly which includes a multi-part female connector having a housing with a gasket captively retained therein. The connector further includes a portion which seals the housing and retains the sensor assembly and terminals thereof. This portion may be readily configured to accommodate various designs and orientations of sensor. The connector of the present invention provides for a very secure environmental seal, is easy to use and assemble and can be readily adapted to a variety of applications. These and other advantages of the present invention will be readily apparent from the drawings, discussion and description which follow.

BRIEF DESCRIPTION OF THE INVENTION

There sealable electrical connector assembly for a sensor. The assembly includes a terminal member having a first end configured to establish electrical communication with the sensor and a second end configured to establish electrical communication with a mating connector. The assembly further includes a grip member configured to support the terminal member so that the second end of the terminal member projects therefrom. The connector assembly also includes a housing member having an interior surface which defines a passageway therethrough. The passageway is open at a first and a second end of the housing. A first length of the passageway has a first circumference and a second length of the passageway has a second circumference greater than the first circumference. The second length defines a seal retaining region which includes an undercut edge at the junction of the first and second lengths. The assembly further includes an elastomeric ring seal having an interior circumference which corresponds generally to the first circumference of the passageway and an exterior circumference which corresponds generally to the second circumference of the passageway. The ring seal includes a first edge configured to engage, and be retained by, the undercut edge in the passageway. The first end of the housing is configured to be fastened to, and closed by, the grip member so that the second end of the terminal member projects into the interior passage of the housing.

The grip member may, in some instances, be configured to engage and support a particular sensor. In one embodiment, the undercut edge of the seal retaining region is configured as a V-shaped groove whereas in another embodiment it is configured as a step. In another embodiment, the seal retaining region of the passageway adjoins the first end of the housing and the grip member includes a retaining portion which is configured to project into the passageway of the housing and to cooperate with the interior surface thereof proximate the first end of the housing to provide an undercut retainer for a second end of the elastomeric ring seal, which second end is preferably configured to engage and be retained by the undercut retainer.

The connector assembly may further include a mating connector which is configured to pass through the opening in the second end of the housing and be retained within the housing. The mating connector includes means for providing electrical communication with the terminal retained in the passageway. The mating connector preferably establishes sliding contact with the interior circumference of the ring seal when disposed in the passageway. The mating connector may include an electrically conductive cable associated therewith. The cable includes a mating terminal which engages and establishes electrical communication with the terminal member and in yet another embodiment, the cable can include a strain relief fitting associated therewith. In particular embodiments, the first end of the housing is permanently affixed to the grip member by a weld.

The invention also provides an improved sensor assembly including a sensor operative to generate an impact signal in response to impact induced movement of a sensor element along a sensor axis; a sensor housing defining a mounting surface lying in a mounting plane; and first and second bracket members coacting to mount the sensor in the housing and having a first interrelated relationship in which the sensor axis has a first angular relationship to the mounting plane and a second interrelated relationship in which the sensor axis has a second, different angular relationship to the mounting plane. In the disclosed embodiment, the first angular relationship is generally perpendicular to the mounting plane and the second angular relationship is generally parallel to the mounting plane so that the sensor assembly may be mounted in the associated vehicle, for example, against either a mounting surface parallel to the longitudinal axis of the vehicle or a mounting surface perpendicular to the longitudinal axis of the vehicle.

The invention also provides an improved elastomeric ring seal having a central axis and having an interior circumference defining a series of first axially spaced transversely extending ridge sections disposed at one circumferential location and a corresponding series of second axially spaced transversely extending ridge sections disposed at a diametrically opposed circumferential location and axially staggered with respect to the first ridge sections. In the disclosed embodiment, the first and second series of ridges are constituted by a series of closed loop annular ridges formed on the interior circumference of the seal with each annular ridge disposed obliquely with respect to the central seal axis and defining a first ridge section and a corresponding second ridge section. The described arrangement, including staggered ridge sections at diametrically opposed locations in the inner circumference of the seal, produces an essentially uniform resistance to insertion of a device such as a connector housing into the seal.

BRIEF DESCRIPTION OF THE DRAWINGS

FIG. 3 is a cross-sectional view of a portion of the connector illustrated in FIG. 2, particularly illustrating the interaction of a housing and grip member to retain a ring seal;

FIG. 4 is a cross-sectional view of a portion of another embodiment of connector assembly structured in accord with the principals of the present invention and illustrating a step like undercut to retain the ring seal;

FIG. 8 is a fragmentary view of a further embodiment of the invention connector assembly;

FIGS. 9 and 10 are exploded perspective views illustrating alternate assembly techniques for the connector assembly of FIG. 8; and FIG. 11-14 are detail views illustrating various component elements of the connector assembly of FIG. 8.

DETAILED DESCRIPTION OF THE INVENTION

The present invention is directed to an environmentally sealable connector assembly which may be utilized to provide electrical communication with a variety of sensors and which is particularly suited for use in harsh environmental conditions. The present invention will be described with reference to a connector for an accelerometer utilized as a triggering sensor for an airbag system for a motor vehicle although it is to be understood that the principals of the present invention may be extended to a variety of other connectors.

Figure 1:
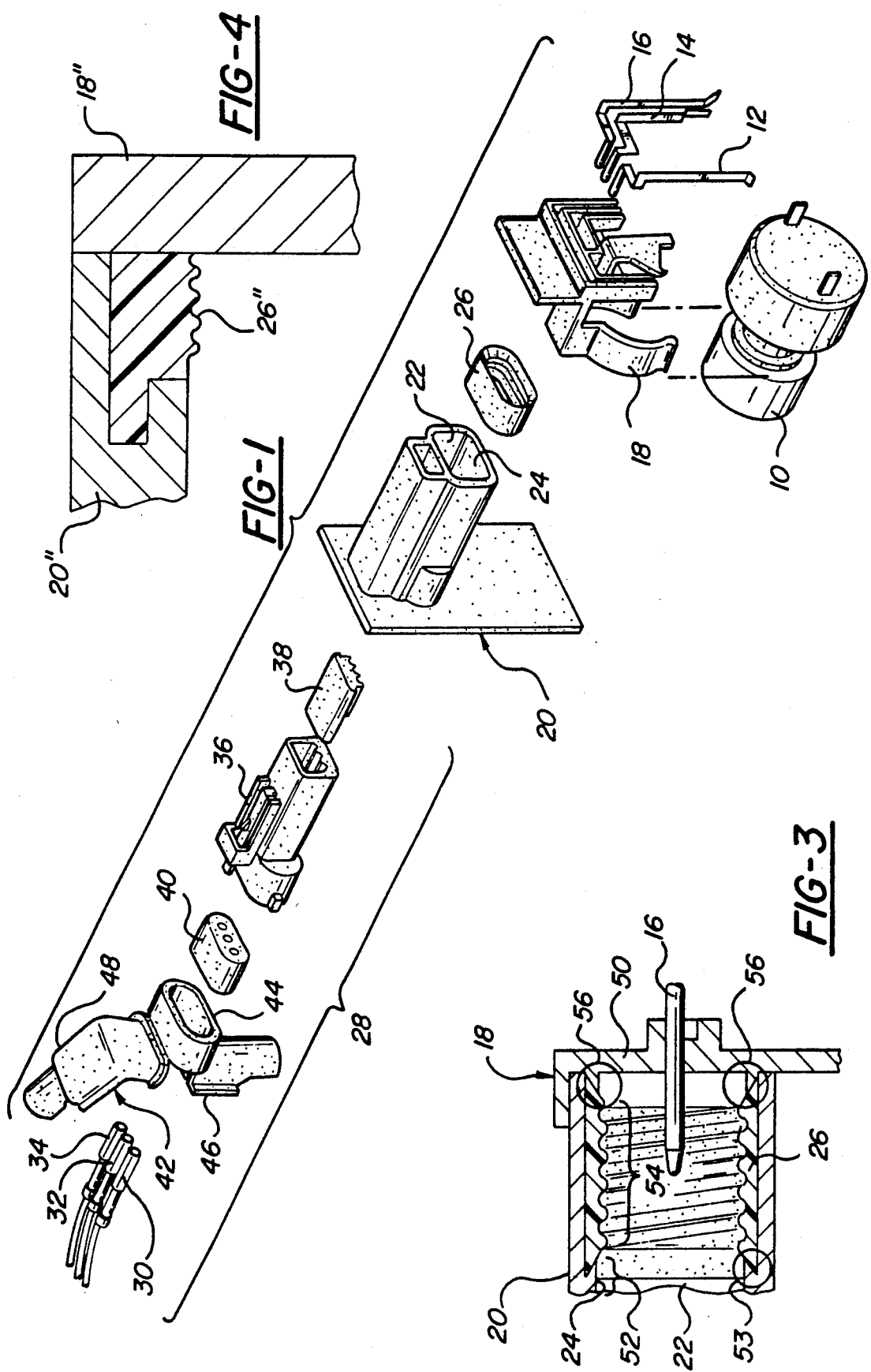
FIG. 1 perspective view of one embodiment of connector assembly structured in accord with the principles of the present invention and further including a sensor and a mating connector.

Referring now to FIG. 1, there is shown an exploded, perspective view of a connector assembly structured in accord with the principals of the present invention as particularly employed in an automotive application for providing electrical communication between an airbag sensor and the remainder of the airbag triggering system. Shown in the figure is a sensor 10 which, as previously described herein above is generally a ball and tube accelerometer. The connector assembly includes three terminal members 12, 14 and 16. Each of the terminal members has first end which establishes electrical communication with the sensor 10 and a second end which establishes electrical communication with a mating connector. In this illustrated embodiment, the second ends of the terminal 12, 14 and 16 are configured as pin terminals and as such they are operative to engage socket terminals. It will be understood that various other configurations of terminals may be similarly employed. The terminals are also engaged by a grip member 18 so that the second ends project from a portion of the grip member 18.

The connector assembly further includes a housing member 20 which has a passageway 22 therethrough. The passageway is bounded and defined by an interior surface 24 of the housing and in the illustrated embodiment, the housing 20 is opened at both ends of the passageway 22. The connector further includes a ring seal 26 which is fabricated from an elastomeric material and which is configured to cooperate with the housing 20 so as to be retained therein. This ring seal is preferably manufactured from silicone rubber, synthetic rubber, natural rubber or another such elastomeric material. As will be described in greater detail hereinbelow, the ring seal 26 serves to provide a sliding seal with a mating connector and it is this seal which excludes moisture, oil and grease, and other contaminants from the region of the electrical connections.

In the illustrated embodiment of FIG. 1 there is also shown a harness connector 28 which includes a connector housing 36 which fits in the passageway 22 of housing 20 and establishes electrical communication between the wiring harness of the vehicle and the sensor 10. The harness connector further includes three socket terminals 30, 32, 34 which are configured to engage, and establish electrical communication with the pin terminals 12, 14 and 16 respectively. As is well known to those of skill in the art, the harness connector housing 36 is configured internally to receive the socket terminals 30, 32 and 34 and the harness connector includes a wedge 38 which cooperates with the harness connector housing 36 to retain the terminals therein.

The harness connector 28 may further include a sealing grommet 40 fabricated from an elastomeric material and disposed in the harness connector housing 36 to encircle and seal the electrical wires associated with the socket terminals 30, 32 and 34. Also illustrated is a hinged strain relief cover 42 which includes a collar portion 44 which engages an exterior end of the harness connector housing 36. The strain relief cover 42 also includes two cover portions 46 and 48 hingedly attached to the collar 44. The cover portions enclose the wires associated with the socket terminals 30, 32 and 34 and further engage, and attach to a wiring harness conduit (not shown). The strain relief cover 42 is fabricated from a somewhat flexible material such as polyethylene, polypropylene and the like and in addition to further covering and protecting the electrical conductors, it also serves to absorb any shock or strain applied to the wiring harness so as to prevent damage or unseating of the connector assembly.

Figure 2:
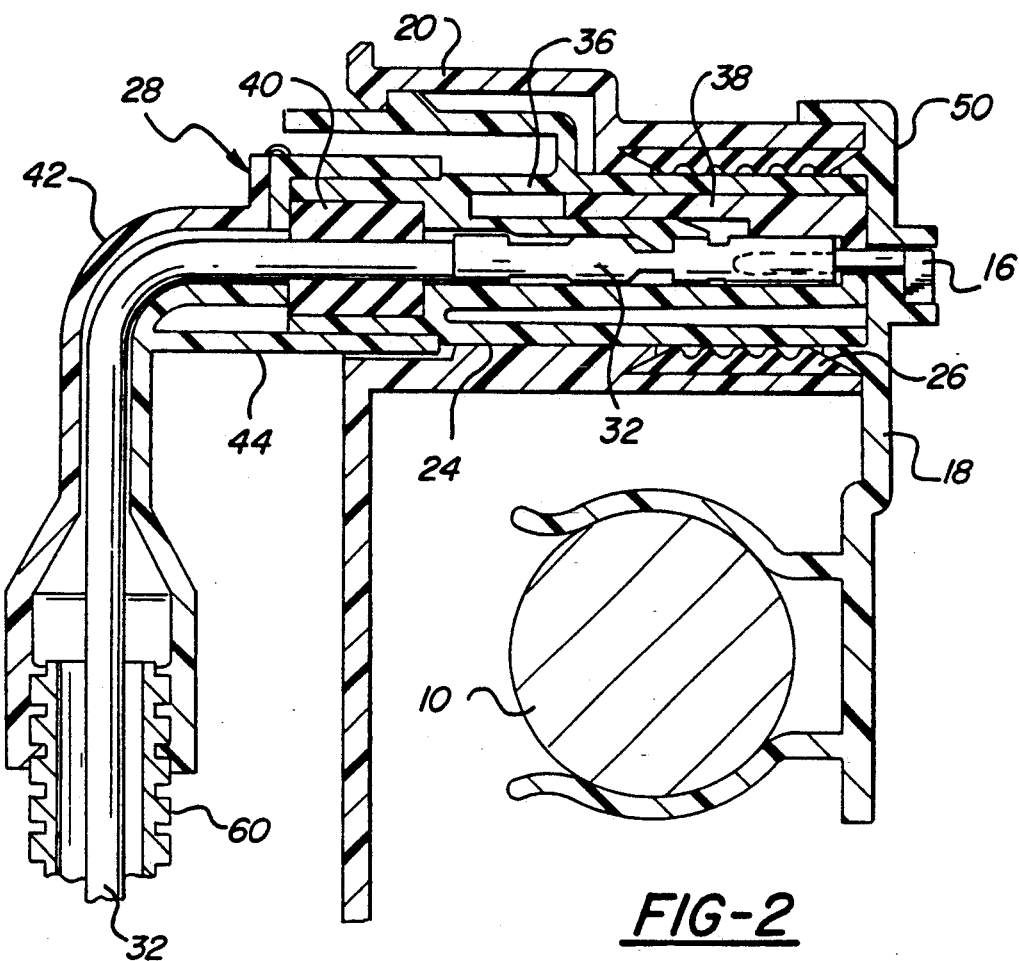
FIG. 2 is a cut-away, side elevational view of a connector and associated components generally similar to those of FIG. 1 assembled form.

Referring now to FIG. 2 there is shown a cross-sectional view of a connector assembly generally similar to that of FIG. 1. The assembly includes a grip member 18, which engages a sensor 10 and as noted hereinabove retains and supports electrical terminals, such as pin terminal 16 so that the terminal 16 projects therefrom. The illustration of FIG. 2 further depicts the housing member 20. As will be noted from the figure, the housing member 20 is open at either end and includes a passageway defined therethrough by an interior surface 24 of the housing 20. The passageway is configured to receive and permanently retain the ring seal 26 therein.

Referring now to FIG. 3 there is shown a simplified and enlarged view of a portion of the FIG. 2 connector showing the grip member 18, housing member 20 and ring seal 26 and illustrating the manner in which these components cooperate. The interior surface 24 of the housing 20 defines a passageway 22 therethrough, which passageway 22 includes a first length 52 and a second length 54. The circumference of the second length 54 is greater than the circumference of the first length 52. It is to be noted that within the context of the this disclosure "circumference" is meant to define the interior perimeter of the passage and is meant to include passageways having cross sections which are circular as well as square, rectangular or otherwise configured.

The larger circumference second portion 54 if of a length generally similar to the length of the ring seal 26 and provides a seal retaining region. It will be noted that the seal retaining region includes an undercut edge 53 where the first 52 and second 54 length join. In the FIG. 3 embodiment, the undercut edge 53 is configured as a V-shaped groove and it will be noted that the ring seal 26 includes an edge configured to fit into this V-shaped groove. The interior circumference of the ring-shaped gasket 26 corresponds generally to the circumference of the first length 52 of the interior passage 22 and the exterior circumference of the ring seal 26 corresponds generally to the circumference of the second length 54 of the passage 22. In this manner, the ring seal 26 fits in and tightly engages the housing member 20. "Circumference" is used in connection with the ring seal 26 in the same manner it is used in describing the housing, and is meant to define the exterior or interior perimeter of the ring seal 26. Also, it is to be understood that the ring seal corresponds to the interior passage and may be circular, square or otherwise shaped, provided it includes an interior and an exterior circumference.

The grip member 18 includes a closure plate portion 50 which supports a terminal 16 projecting therefrom. The closure plate portion 50 engages the first end of the housing 20 and is sealed thereagainst, as for example by adhesive affixation or ultrasonic welding. It will be noted that the closure plate portion 50 of the grip member 18 includes a generally V-shaped retaining portion 56 which projects into the passageway 22 when the grip member 18 is affixed to the housing 20. The retaining portion 56 cooperates with the housing 20 to provide an undercut retainer which functions in the same manner as the undercut edge of the housing to retain the seal therein. It will be noted from FIG. 3 that the terminal 16 is exposed in the passageway 22 proximate the ring seal 26 and electrical connection thereto may be readily achieved by the use of a mating connector which engages the terminal 16 and the ring seal 26 will provide for a sliding fit with an appropriately configured mating connector so as to seal the electrical connection between the terminals.

Figure 5:
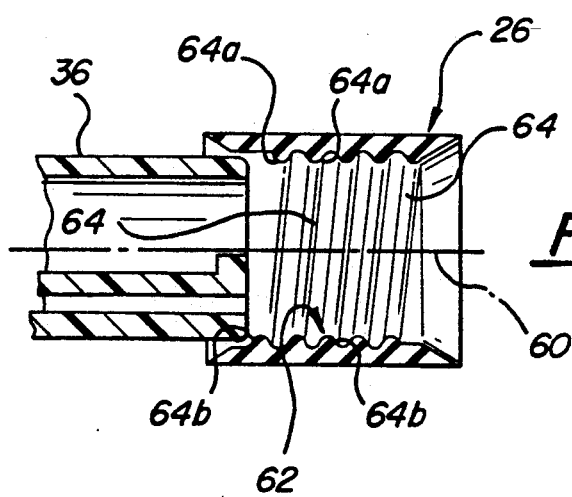
FIGS. 5 are 6 are detail views of the ring seal.

Further details of ring seal 26 are seen in FIGS. 3, 5, and 6. Specifically, ring seal 26 has an oval configuration in transverse cross section and defines a central axis 60. Seal 26 includes an interior circumference 62 defining a series of closed loop annular ridges 64 formed on the interior circumference of the seal with each annular ridge disposed obliquely with respect to the central seal axis so that each ridge defines a first ridge section 64a at an upper circumferential location and a second ridge section 64b at a lower diametrically opposed circumferential location with the lower ridge 64b staggered with respect to the upper ridge 64a. The oblique angle of the ridges is such that each first ridge section 64a is positioned axially between a pair of lower ridge sections 64b and each lower ridge section 64b is positioned axially between a pair of upper ridge sections 64a. Although the first and second ridge sections have been described in relation to an upper ridge section and a lower ridge section, it will be apparent that the same staggered relationship will hold true for any two diametrically opposed locations on the annular ridges.

Figure 7:
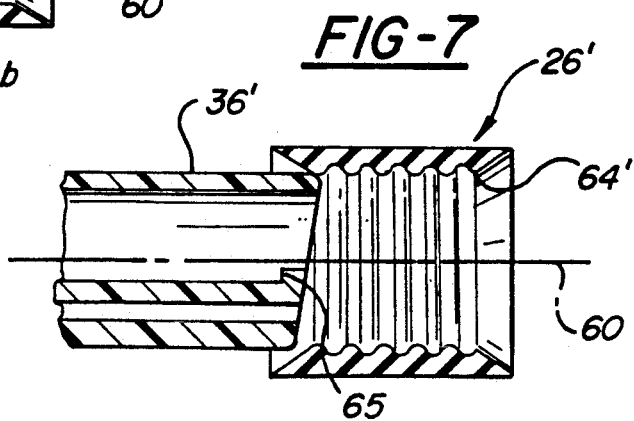
FIG. 7 is a view of an alternate ring seal configuration.

The described arrangement, including staggered ridge sections at diametrically opposed locations in the inner circumference of the seal, produces an essentially uniform resistance to insertion of the connector housing 36 as the connector housing is slid into the seal since at any given point in the axial movement of the connector housing into the seal, and looking at any given point on the connector housing, the connector housing is encountering only an upper or a lower ridge with frictional engagement with a lower ridge commencing at such time as the frictional engagement with the corresponding but axially staggered upper ridge is ceasing. Alternatively, as seen in FIG. 7, the same basically uniform resistance result may be achieved by utilizing a seal 26' having interior annular ridges 64' that lie in planes perpendicular to the central axis 60 of the seal and instead bevelling the front edge 65 of the connector housing 36'.

It is to be understood that other configurations of undercut edges may be employed to retain the ring seal in passageway 22. Specifically, as seen in FIG. 4, there is shown a portion of a grip member 18" and housing member 20" which cooperate to retain a ring seal 26" therebetween. The housing member is configured to include a step like undercut edge and the ring seal 26" has a corresponding edge. It will be noted that in this embodiment the grip member 18" establishes a flat seal with the second end of the ring seal 26" although it is to be understood that the grip member 18" may be appropriately configured to provide a second gasket retaining edge.

As seen in FIG. 2, connector housing 36 retains a socket terminal 32 therein by means of wedge 38. The socket terminal 32 is shown in mated engagement with the pin terminal 16. As previously indicated, housing 36 of the harness connector establishes sliding contact with the ring seal 26. The housing 36 further includes a sealing grommet 40 as previously described. This arrangement effectively shields the terminals 16 and 32 from ambient conditions. Further integrity is provided to the connection by the strain relief member 42 which, in this embodiment, is shown attached to a wiring harness conduit 60.

In one particularly preferred embodiment of the present invention the housing member and grip member are made from an insulating material such as an organic polymer. Among the preferred materials are ABS, polyvinyl chloride, polyesters and the like and may include glass fibers or other reinforcing material. As noted above, the ring seal is preferably made from silicone or another such highly resilient elastomer. The terminals members are made of brass, steel, plated steel, copper or other such electrically conductive materials. The hinged strain relief fitting is preferably made from high density polyethylene or from polypropylene, nylon or the like.

The further connector assembly embodiment seen in FIGS. 8-14 includes a sensor 10, a sensor housing assembly 70, a gripper bracket 72, and a housing bracket 74.

Sensor 10, as previously described, is of the type intended for use as the sensor of a motor vehicle airbag system that includes a ball or tube accelerometer in which a ball of a certain mass is normally held in a tube by magnets disposed at one end thereof but wherein, when the sensor is subject to a decelerating force of sufficient magnitude such as occurring in a motor vehicle frontal impact situation, the ball becomes dislodged from the magnet so as to roll to the other end of the tube along a sensor axis 76 and cause bridging of a pair of electrical terminals disposed thereat.

Housing assembly 70 includes a box member 78 and an end plate member 80. Box member 78 includes a main body box portion 78a and a mounting flange portion 78b. Flange portion 78b includes mounting holes 78j and defines a flat mounting surface 78k lying in a mounting plane and adapted to be positioned against a suitable mounting surface or plane on the associated motor vehicle. Main body box portion 78a includes a top wall 78c, a bottom wall 78d, side walls 78e and 78f, and an end wall 78g. Walls 78b, 78c, 78d, 78e, and 78f will be seen to coact to define a box structure having an open end 78h.

End plate member 80 includes a planar plate portion 80a sized to be positioned in opening 78h to close the opening and a tubular seal portion 80b of oval cross-sectional configuration defining a passageway 80c extending through the tubular seal portion.

Housing bracket 74 has a oval cross-sectional configuration generally corresponding to the oval cross-sectional sectional configuration of tubular seal portion 80b and includes an outer annular lip 74a, an end wall 74b, and an inner annular lip 74c coacting with outer annular lip 74a to define an annular groove 74d sized to fit over the inner annular end 80d of the tubular seal portion 80b. A plurality of apertures 74e, positioned within inner annular lip 74c, provide passage for the inner ends of connectors 12, 14 and 16 which are suitably connected, as previously described, at their other ends to sensor 10. Bracket 74 has a central axis 80 and includes a first receptacle 74f, extending in a direction parallel to central axis 80, and a second receptacle 74g spaced circumferentially about the central axis from the first receptacle and extending in a direction generally perpendicular to central axis 80. Specifically, receptacle 74f includes opposed downwardly extending flange portions 74h coacting to define a trapezoidal groove extending generally parallel to axis 80 and receptacle 74g includes opposed upstanding flange portions 74i coacting to define a trapezoidal groove extending perpendicular to axis 80.

Gripper bracket 72 includes a circular end wall 72a defining a central axis 82, a plurality of gripper finger portions 72b of varying lengths extending in cantilever fashion from end wall 72a in parallel relation to axis 82 and spaced circumferentially about axis 82, and a male device 72c. Male device 72c is formed on a tangential wall 72d formed integral with one of the fingers 72b and has a trapezoidal cross-sectional configuration corresponding to the trapezoidal cross-sectional configuration of the grooves defined by receptacles 74f and 74g. It will be understood that fingers 74b coact to grippingly engage circumferentially spaced portions on the periphery of sensor 10 so as to mount the sensor securely within bracket 72 with the sensor axis 76 coinciding with the bracket axis 82.

In assembled relation, the end plate portion 80a of end plate member 80 is positioned in and closes the open end 78h of housing member 78 with the tubular seal portion 80b extending inwardly into the chamber 86 defined within the box housing 78 and with housing bracket 74 fitted over the inboard end 80d of tubular seal portion 80b.

It will be seen that the brackets 74 and 72 coact to position the sensor 10 within the chamber 86, alternatively, in a first position in which the axis 76 of the sensor is parallel to the mounting plane 78k of the housing mounting flange portion 78b and a second position in which the axis 76 of the sensor is generally perpendicular to the mounting plane 78k of the housing mounting flange portion 78b.

Figure 10:
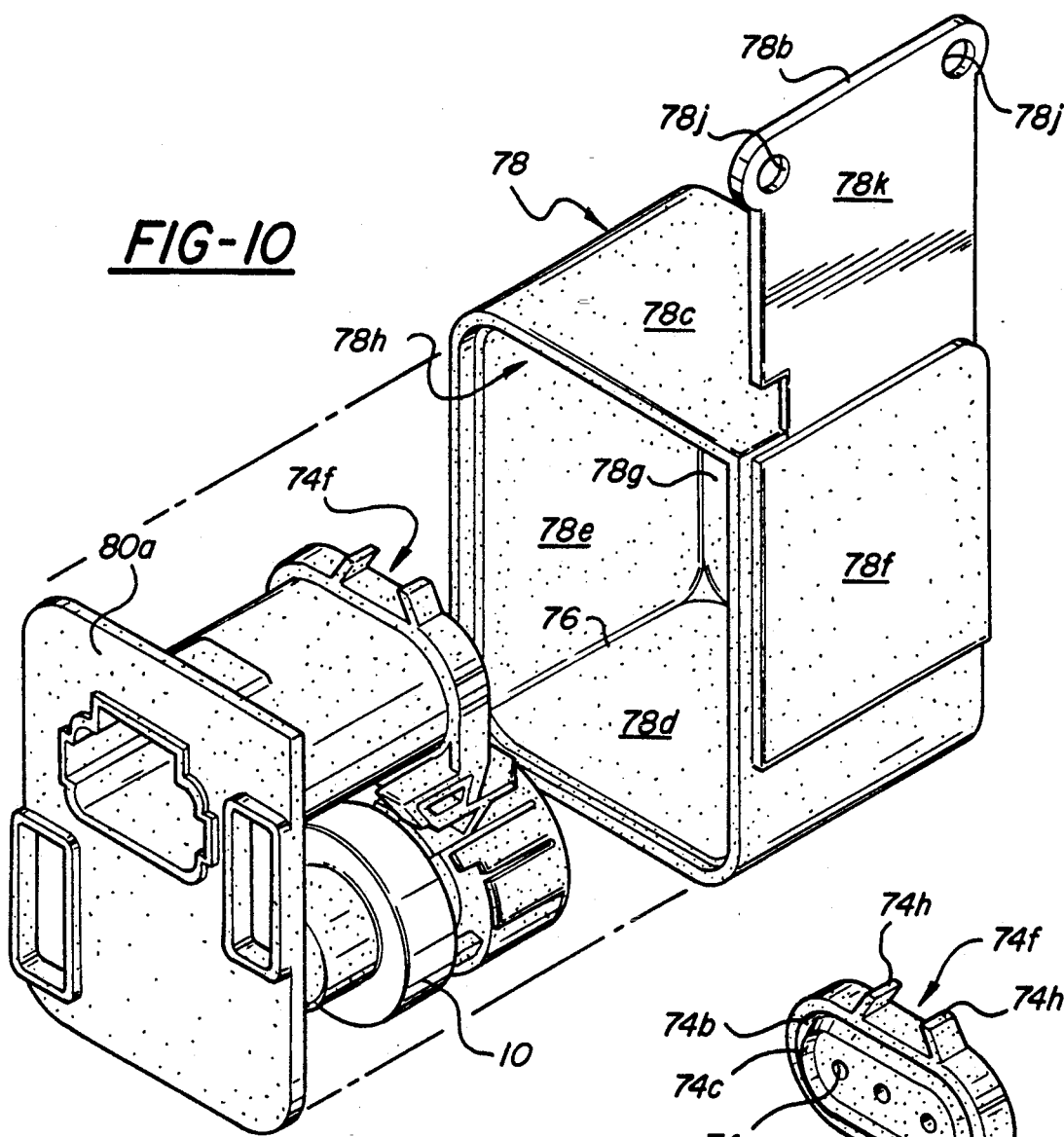
Figure 14:
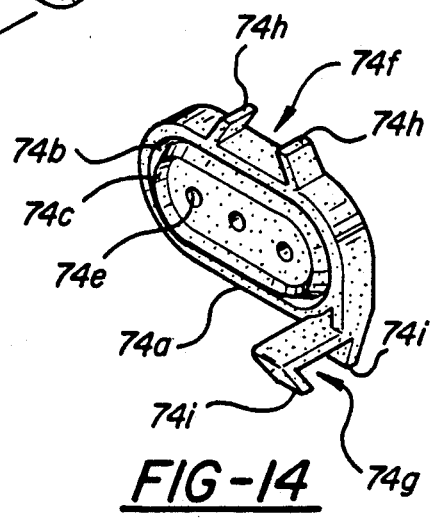
Figure 11:
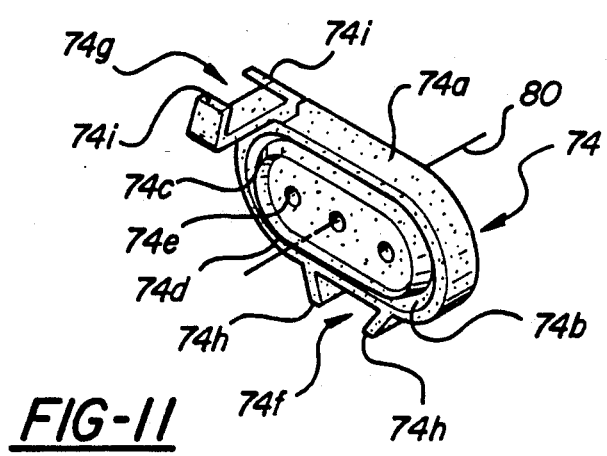

Specifically, with bracket 74 fitted over the inboard end 80d of tubular seal portion 80b with receptacle 74f downwardly disposed and tongue 72c fitted slidably in receptacle 74f (as seen in FIG. 9), the sensor 10 is positioned within the chamber 86 with its impact axis 76 positioned generally perpendicular to the mounting plane 78k of housing mounting flange portion 78b and, alternatively, with mounting bracket 74 turned through 180° and fitted over the inboard end 80d of tubular seal portion 80b with receptacle 78f upstanding so as to dispose receptacle 74g at approximately 5:00 o'clock (as seen in FIG. 14) and with tongue 72c positioned in receptacle 74g (as seen in FIG. 10) the sensor will be positioned within chamber 86 with its impact axis 76 generally parallel to the mounting plane 78k of housing mounting flange portion 78b. The box member 78 further includes a grounding terminal therwithin for establishing a ground connection to the sensor 10. The terminal is preferably coated with an electrocoat primer which provides good adherence to the epoxy potting compound which is employed to fill the box member 78. The grounding terminal is in electrical communication with the box member 78 and a good ground connection is established to the vehicle through the flange 78b.

The ability of the bracket 74 and 72 to coact to alternately position the sensor with its impact axis parallel to or perpendicular to the mounting plane of the mounting flange provides extreme versatility with respect to the mounting of the connector assembly in a motor vehicle to provide the sensor of an airbag system. Specifically, if a mounting surface generally perpendicular to the longitudinal axis of the motor vehicle is available, the sensor disposition seen in FIG. 9 will be employed so that, with the flange 78b mounted against a face extending transversely of the vehicle, the impact axis 76 of the sensor will extend parallel to the motor vehicle longitudinal axis so as to properly sense frontal impact of the vehicle and, alternatively, if the convenient and available mounting surface of the motor vehicle extends parallel to the longitudinal axis of the motor vehicle, the sensor disposition seen in FIG. 10 will be employed so that, with the flange 78b mounted against the mounting surface extending generally parallel to the longitudinal axis of the vehicle, the sensor axis 76 will again be parallel to the vehicle axis to again provide proper sensing for frontal impact.

It will be understood, as with the connector assembly illustrated and described in connection with the FIGS. 1-4 embodiment, that in the completed assembly a harness connector 36 will be inserted in passageway 80c for sliding and sealing coaction with ring seal 26 positioned in the inboard end of tubular seal portion 80b to establish electrical connection with the inboard ends of terminals 12, 14 and 16 extending through bracket apertures 74e and that a strain relief cover 42 will also be utilized in the manner illustrated with respect to the FIGS. 1-4 embodiment.

It will be appreciated that the present invention may be employed to provide electrical connectors for a variety of applications and as such has significant utility outside the field of connecting airbag sensors. The invention generally comprises a two-part housing retaining a gasket therein and a variety of housing configurations may be employed to retain the gasket. As noted, the housing can include V-shaped or stepped shaped undercut regions and may also include arcuate undercuts, saw tooth undercuts and the like. The grip member may be manufactured in a variety of configurations to accommodate differing sensors and/or different sensor placements. In this manner a "generic" housing may be coupled with a specific grip member to provide a connector for a specific application. This approach minimizes the inventory of components a manufacturer needs to stock.

In view of the foregoing it will be understood that the present invention may be practiced in a variety of configurations and for a variety of applications. Accordingly, it will be appreciated that the foregoing drawings, discussion and description are merely meant to illustrate particular embodiments of the invention and are not meant to be limitations upon the practice thereof. It is the following claims, including all equivalents, which define the scope of the invention.

We claim:

1. An environmentally sealable electrical connector assembly for a sensor including:
    a terminal member having a first end configured to establish electrical communication with the sensor and a second end configured to establish electrical communication with a mating connector;
    a grip member configured to support said terminal member so that the second end of the terminal member projects therefrom;
    housing member having an interior surface which defines a passageway therethrough, said passageway being open at a first end and at a second end of the housing, a first length of said passageway having a first circumference and a second length of said passageway having a second circumference greater than said first circumference, said second length defining a seal retaining region of said interior surface, said seal retaining region including an undercut edge at the junction of the first and second length;
    an elastomeric ring seal having an interior circumference which corresponds generally to the first circumference of the passageway and an exterior circumference which corresponds generally to the second circumference of the passageway, said ring seal including a first edge configured to engage, and be retained by, the undercut edge;
    wherein the first end of said housing is configured to be fastened to, and closed by, the grip member so that the second end of said terminal member projects into the interior passage of the housing.

2. A connector assembly as in claim 1, wherein the grip member is further configured to engage and support a sensor.

3. A connector assembly as in claim 1, wherein the undercut edge of the seal retaining region is configured as a V-shaped groove.

4. A sensor assembly as in claim 1, wherein the undercut edge of the seal retaining region is configured as a step.

5. An electrical connector as in claim 1, wherein the first end of the housing is permanently affixed to the grip member by a weld.

6. An electrical connector as in claim 1, further including a second terminal member having a first end configured to establish electrical communication with the sensor and a second end configured to establish electrical communication with a mating connector.

7. An electrical connector assembly as in claim 1, wherein the seal retaining region adjoins the first end of the housing.

8. An electrical connector as in claim 7, wherein the grip member includes a retaining portion which projects into the passageway of the housing and cooperates with the interior surface thereof proximate the first end of the housing to provide an undercut retainer.

9. An electrical connector as in claim 8 wherein the ring seal includes a second edge configured to engage and be retained by the undercut retainer.

10. An electrical connector as in claim 1, further including a mating connector configured to pass through the openings at the second end of the housing and to be retained therein, said mating connector including means for providing electrical communication with said terminal member in the passageway.

11. An electrical connector as in claim 10 wherein said mating connector establishes sliding contact with the interior circumference of the ring seal when said mating connector is disposed in the passageway of the housing.

12. An electrical connector as in claim 10 wherein said mating connector includes an electrically conductive cable associated therewith which cable includes a mating terminal for engaging and establishing electrical communication with said terminal member, said connector further including a strain relief fitting.

13. An electrical connector as in claim 12, wherein said strain relief fitting includes a collar which engages the mating connector and two covers hingedly attached to the collar, said covers being operable to clamp onto said cable and enclose the electrical conductor therebetween.

14. An environmentally sealable airbag sensor assembly comprising:
    accelerometer having a pair of electrical connectors associated therewith;
    a first and a second terminal member, each having a first end configured to establish electrical communication with one of the pair of electrical connectors on the accelerometer and a second end configured to establish electrical communication with a mating connector;
    a grip member having a retainer portion operative to support the accelerometer, said grip member further including a closure plate configured to support said terminal members so that they project therefrom;
    a housing member including an interior surface which defines a generally elongated passageway therethrough, said passageway being open at a first end and at a second end of the housing, a first length of the passageway having a first circumference and a second length of the passageway having a second circumference greater than the first circumference, the second length defining a seal retaining region of the interior surface which adjoins the first end of the housing, the seal retaining region including an undercut edge at the junction of the first and second lengths;
    an elastomeric ring seal having an interior circumference which corresponds generally to the first circumference of the passageway and an exterior circumference which corresponds generally to the second circumference of the passageway, the ring seal including a first edge configured to engage and be retained by the undercut edge;
    wherein the first end of the housing is attached to the closure plate of the grip member so that the plate closes the first end of the housing and the terminals project into the passageway.

15. An environmentally sealable electrical connector assembly for a sensor including a terminal member having a first end configured to establish electrical communication with the sensor and a second end configured to establish electrical communication with a mating connector;
  a grip member adapted to grip the sensor and configured to support said terminal member so that the second end of the terminal member projects therefrom;
  a housing member having an axial passageway extending therethrough and secured to said grip member with said second terminal end projecting into the passageway; and
  an elastomeric ring seal positioned in the passageway in surrounding relation to the second terminal end, adapted to slidably receive the mating connector, and having an interior circumference defining a series of first axially spaced transversely extending ridge sections disposed at one circumferential location and a corresponding series of second axially spaced transversely extending ridge sections disposed at a diametrically opposed circumferential location and axially staggered with respect to the first ridge sections.

16. A connector assembly according to claim 15 wherein:
  said first and second series of ridge sections are constituted by a series of closed loop annular ridges formed on the interior circumference of the seal with each annular ridge disposed obliquely with respect to the passageway axis and defining a first ridge section and a corresponding second ridge section.

17. An elastomeric ring seal having a central axis and having an interior circumference defining a series of first axially spaced transversely extending ridge sections disposed at one circumferential location and a corresponding series of second axially spaced, transversely extending ridge sections disposed at a diametrically opposed circumferential location and axially staggered with respect to the first ridge sections.

18. A seal according to claim 17 wherein said first and second series of ridge section are constituted by a series of closed loop annular ridges formed on the interior circumference of the seal with each annular ridge disposed obliquely with respect to the central seal axis and defining a first ridge section and a corresponding second ridge section.

19. A sensor assembly comprising:
  a sensor operative to generate an impact signal in response to impact induced movement of a sensor element along a sensor axis;
  a sensor housing defining a mounting surface lying in a mounting plane; and
  first and second bracket members coacting to mount the sensor in the housing and having a first interrelationship in which the sensor axis has a first angular relationship to the mounting plane and a second interrelationship in which the sensor axis has a second, different angular relationship to the mounting plane.

20. A sensor assembly according to claim 19 wherein:
  the first angular relationship is generally perpendicular to the mounting plane and the second angular relationship is generally parallel to the mounting plane.

21. A sensor assembly according to claim 20 wherein:
  said first bracket member mounts the sensor;
  said second bracket mounts on the housing;
  one of the bracket members defines a first receptacle extending in a first direction and a second receptacle extending in a second direction perpendicular to the first direction; and
  the other bracket member defines a male device sized to fit in either said first or said second receptacle and thereby position the members in a first interrelationship or a second interrelationship perpendicular to the first interrelationship.

22. A sensor assembly according to claim 21 wherein:
  the receptacles comprise grooves sized to slidably receive the tongue.

23. A sensor assembly according to claim 20 wherein:
  the sensor housing comprises a housing assembly including a box member having an open end and defining a chamber therewithin for receipt of the sensor and the first and second brackets, and an end plate member having an end plate portion sized to fit in and close the open end of the chamber and a tubular seal portion extending inwardly into the chamber and defining a passageway for the receipt of a harness connector;
  the first bracket member is mounted on the inboard end of the tubular seal portion;
  the second bracket member is mounted on the first bracket member; and
  the sensor is mounted on the second bracket member.

24. A sensor assembly according to claim 23 wherein the first bracket member has a central axis coincident with the central axis of the passageway;
  the first bracket member defines a first receptacle extending in a direction parallel to the central axes and a second receptacle spaced circumferentially about the central axes from said first receptacle and extending in a direction perpendicular to the central axes; and
  the second bracket member includes a male device sized to fit in either said first or said second receptacles and thereby position the sensor in a first position in which the sensor axis is generally parallel to the mounting surface or a second position in which the sensor axis is generally perpendicular to the mounting surface.

* * * * *

UNITED STATES PATENT AND TRADEMARK OFFICE
CERTIFICATE OF CORRECTION

PATENT NO. : 5,297,976
DATED : March 29, 1994
INVENTOR(S) : A. VanDerStuyf, et al.

It is certified that error appears in the above-indentified patent and that said Letters Patent is hereby corrected as shown below:

Column 3, Line 36, after "There" please insert -- is disclosed herein an environmentally --.

Column 5, Line 2, after "FIG.1" please insert -- is an exploded, --.

Column 5, Line 9, after "FIG.1" please insert --shown in --.

Column 11, Line 26, before "housing" please insert -- a --.

Column 14, Line 26, after "wherein:" insert new sentence
¶ -- the male device comprises a tongue; and --.

Signed and Sealed this

Sixteenth Day of August, 1994

Attest:

BRUCE LEHMAN

*Attesting Officer*     *Commissioner of Patents and Trademarks*